J. H. SCROGGIN.
INSECT TRAP.
APPLICATION FILED JUNE 6, 1911.
1,036,153.
Patented Aug. 20, 1912.
2 SHEETS—SHEET 1.
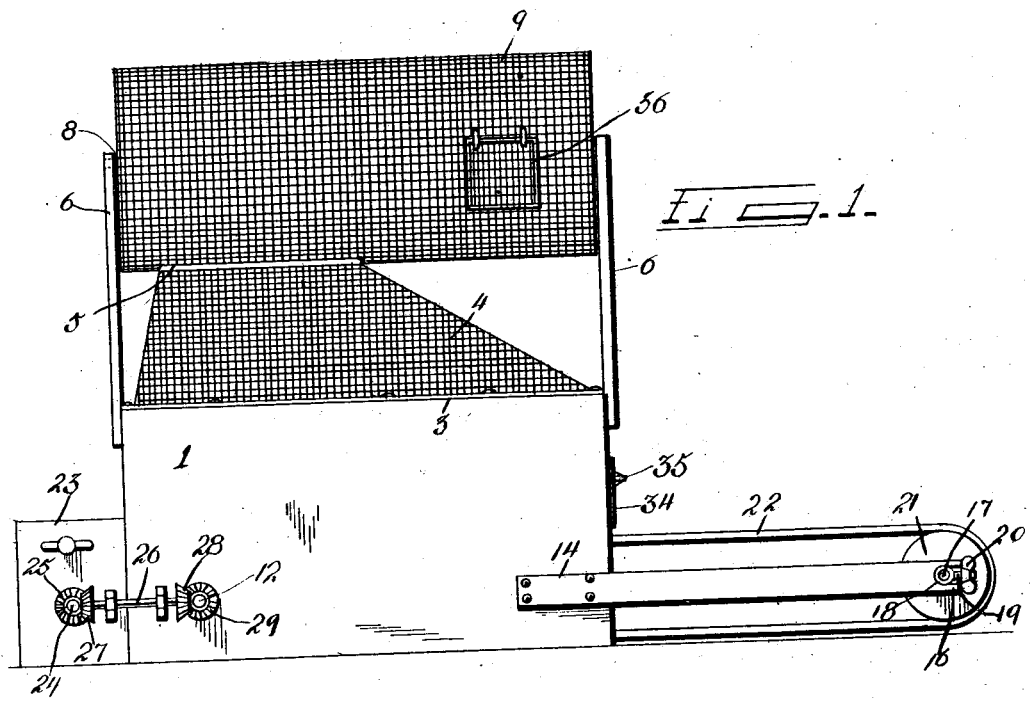
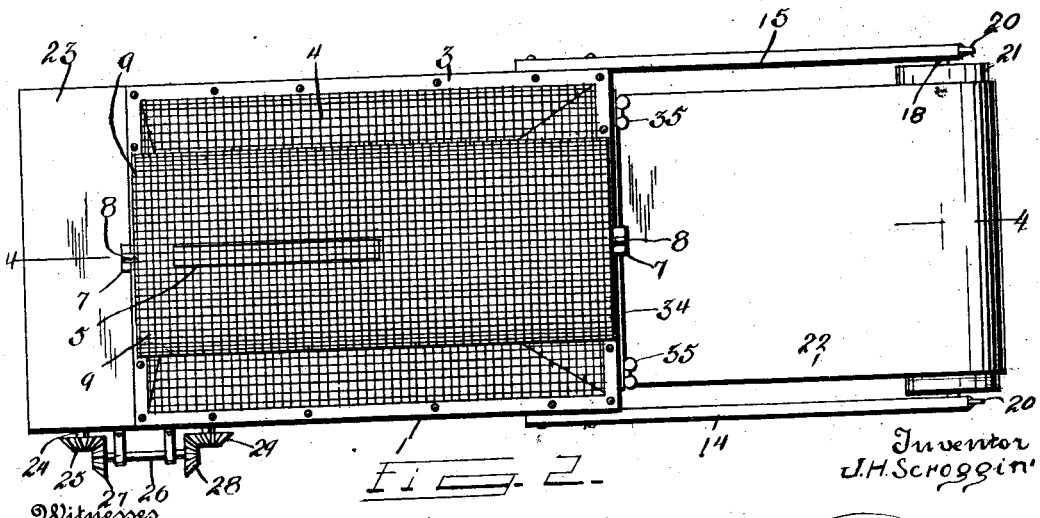
Witnesses
Inventor
J. H. Scroggin
By
Attorneys

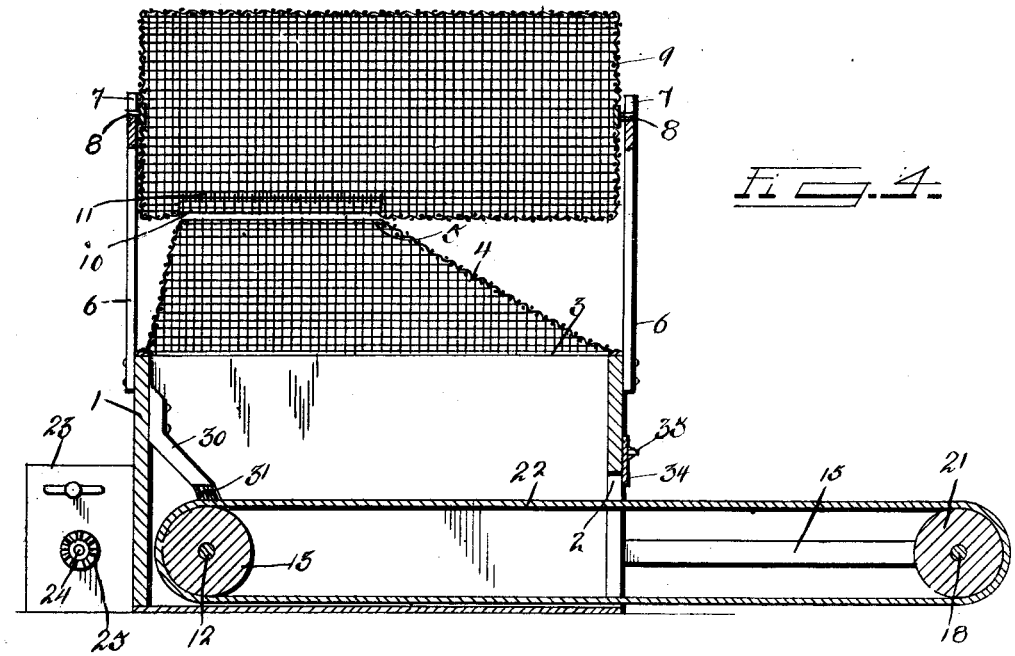
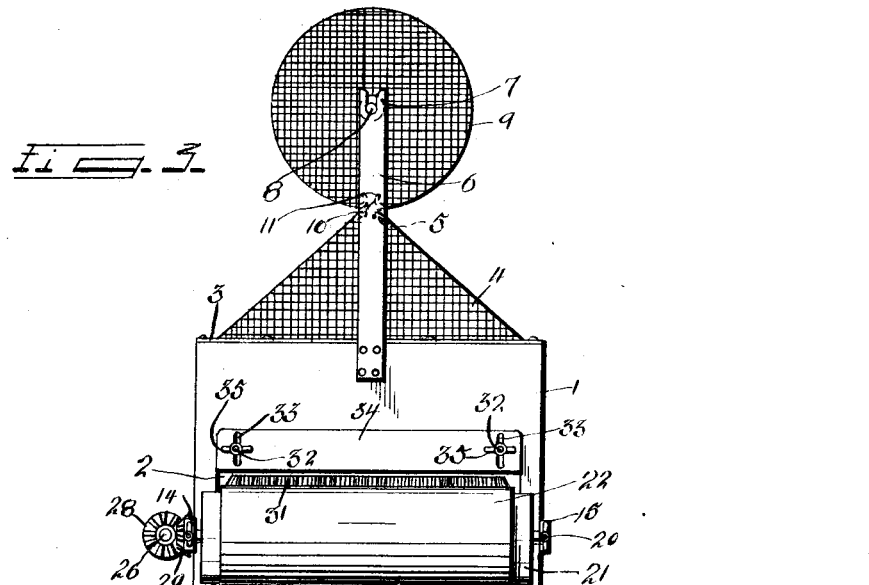
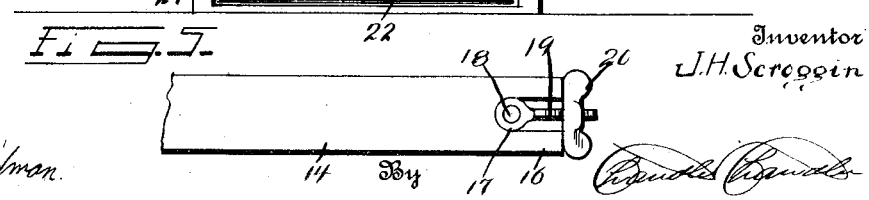

UNITED STATES PATENT OFFICE.

JOHN H. SCROGGIN, OF STARKVILLE, MISSISSIPPI.

INSECT-TRAP.

1,036,153.  Specification of Letters Patent.  Patented Aug. 20, 1912.

Application filed June 6, 1911. Serial No. 631,545.

*To all whom it may concern:*

Be it known that I, JOHN H. SCROGGIN, a citizen of the United States, residing at Starkville, in the county of Oktibboha, State of Mississippi, have invented certain new and useful Improvements in Insect-Traps; and I do hereby declare the following to be a full, clear, and exact description of the invention, such as will enable others skilled in the art to which it appertains to make and use the same.

My invention relates to new and useful improvements in insect traps, and the object of my invention is to improve the construction and increase the efficiency of traps of the above described character.

A further object of my invention is to provide a trap having a belt which is movable into a cage member and which may be covered with any suitable preparation adapted to attract the insects causing them to alight thereon and to be carried into the cage.

A further object of my invention is to provide means for removing the insects so caught from the belt. And a still further object of my invention is to provide an auxiliary cage into which the insects will escape from the main cage and which is removable from the trap.

With these and other objects in view, my invention will be more fully described, illustrated in the drawings which show a preferred embodiment of my device and then specifically pointed out in the claim which is attached to and forms a part of this application.

In the accompanying drawings, Figure 1 is a side elevation of the trap. Fig. 2 is a top plan view. Fig. 3 is an end elevation. Fig. 4 is a section on the line 4—4 of Fig. 2. Fig. 5 is a detail elevation showing the belt adjusting device.

Referring more specifically to the drawings, in which similar reference numerals designate corresponding parts throughout, 1 represents in general the body of my improved trap, which as shown is substantially rectangular in shape and provided at the lower portion of one end with an opening 2, the purpose of which will be hereinafter explained. Secured upon the upper end of this casing or body 1 and serving as a cover for the same is a frame member 3 covered with foraminous material, preferably wire screening 4. As best shown in Fig. 3 of the drawings the sides of this frame 3 converge toward each other their upper ends terminating in spaced parallel relation to each other to form a slot 5.

Extending upwardly from the central portion of each of the end members of the body 1 are strips 6 the upper ends of which are bifurcated to form the forked arms 7 between which is journaled shafts 8 upon which is secured a drum 9 also formed of foraminous material and having a longitudinally disposed slot 10 formed in its side adapted to register with the slot 5 of the main cage. As shown the foraminous material at the edges of this latter slot are bent inwardly to form flanges 11 adapted to prevent the insects after having once passed through into the drum from passing out.

Journaled in the side walls of the body 1 and extending transversely thereof is a shaft 12 and keyed or otherwise secured upon this shaft is a drum 13. Secured upon the outside of each of the side walls of the body member are laterally extending strips 14 and 15 the free ends of which are bifurcated as at 16 and slidably mounted in these bifurcated ends are suitable journal boxes 17 in which is journaled a shaft 18. As shown each of these journal boxes is provided with an outwardly extended threaded stud 19 upon which is threaded a wing nut 20 which bears against the ends of the strip and by means of which the bearings together with their shaft may be adjusted toward and away from the body 1. Mounted upon this shaft between the strips 14 and 15 is a second drum 21 and surrounding these drums 13 and 21 and adapted to be driven thereby is a belt 22.

Secured to that end wall of the body 1 which is adjacent to the drum 13 is a casing 23 inclosing suitable clock works, not shown, and extending from these clock works is a shaft 24 upon the outer end of which is a bevel gear 25, said gear being adapted to be rotated by the clock work. Journaled in the end wall of the body is a shaft 26 upon the outer end of which is keyed a bevel gear 27 adapted to engage with the bevel gear 25 and upon the other end of this shaft is a second bevel gear 28 which meshes with a bevel gear 29 keyed upon the shaft 12. As will be readily understood the clock work will by means of this gearing actuate the pulley 13 to cause the belt to travel in the direction indicated by the arrow in Fig. 4 of the drawings.

Secured to the inner face of the end wall of the body above the roller or drum 13 is a bracket member 30 which extends downwardly to a point adjacent the belt and is provided at its lower end with a brush 31 which rests lightly against the upper face of the belt.

Extending outwardly from the other end of the body member are a pair of spaced apart threaded studs 32 upon which is slidably mounted by means of the slots 33 a plate 34, said plate being movable toward and away from the belt to adjustably limit the space between the upper edge of the opening and the belt, said plate being secured in adjusted position by means of the wing nuts 35 which are threaded upon the bolts or studs 32 thus firmly clamping the plate against the outer face of the body.

In operation the belt is covered with a preparation adapted to attract flies and the clock work is set in motion. As will be readily understood any flies or other insects alighting on the belt will be drawn into the body member or cage proper of the trap and there removed from the belt by means of the brush 31. As is well known the tendency of all insects in attempting to escape from a trap is to fly upwardly and the insects therefore pass between the walls of the frame 3 and through the slots 5 and 10 into the drum 9 from which they are prevented from escaping by means of the inturned flanges 11 previously described. From time to time this drum may be removed and the insects killed by inserting the same in hot water, or by any preferred means, and in order to permit of ready removal of the insects so killed I have provided the drum with a door 36 which is normally closed but which may be readily opened to give access to the interior of the drum.

What I claim is:—

A device of the character described, comprising a body member having an opening in one end and a cover formed of foraminous material and provided with a slot, a drum formed of foraminous material rotatably supported above said cover and having a slot registering with the slot of the cover when in one position and having inturned edge portions, and means for drawing insects into said body member through the aperture formed therein.

In testimony whereof, I affix my signature, in presence of two witnesses.

JOHN H. SCROGGIN.

Witnesses:
W. W. MAGRUDER,
R. G. DAVIS.

---

Copies of this patent may be obtained for five cents each, by addressing the "Commissioner of Patents, Washington, D. C."